(12) United States Patent
Menegoli

(10) Patent No.: US 6,369,534 B1
(45) Date of Patent: Apr. 9, 2002

(54) CIRCUIT AND METHOD FOR DETECTING BACKWARD SPIN OF A SPINDLE MOTOR FOR A DISK DRIVE

(75) Inventor: Paolo Menegoli, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/559,207

(22) Filed: Apr. 26, 2000

(51) Int. Cl.$^7$ ................................................ H02P 7/06
(52) U.S. Cl. ......................... 318/254; 318/459; 360/75
(58) Field of Search ................................. 318/254, 256, 318/439, 459; 360/74.1, 75

(56) References Cited

U.S. PATENT DOCUMENTS

| | | | |
|---|---|---|---|
| 4,862,052 A | * 8/1989 | Unsworth et al. | 318/757 |
| 4,876,491 A | 10/1989 | Squires et al. | 318/138 |
| 4,992,710 A | 2/1991 | Cassat | 318/254 |
| 5,001,405 A | 3/1991 | Cassat | 318/254 |
| 5,003,241 A | * 3/1991 | Rowan et al. | 318/761 |
| 5,028,852 A | 7/1991 | Dunfield | 318/254 |
| 5,117,165 A | 5/1992 | Cassat et al. | 318/254 |
| 5,172,036 A | 12/1992 | Cameron | 318/138 |
| 5,187,419 A | * 2/1993 | DeLange | 318/805 |
| 5,191,270 A | 3/1993 | McCormack | 318/254 |
| 5,202,614 A | * 4/1993 | Peters et al. | 318/254 |
| 5,254,914 A | 10/1993 | Dunfield et al. | 318/254 |
| 5,343,127 A | * 8/1994 | Maiocchi | 318/254 |
| 5,397,971 A | * 3/1995 | McAllister et al. | 318/254 |
| 5,455,885 A | 10/1995 | Cameron | 388/834 |
| 5,473,725 A | * 12/1995 | Chen et al. | 318/254 |
| 5,569,990 A | 10/1996 | Dunfield | 318/254 |
| 5,850,129 A | * 12/1998 | Yoshino | 318/254 |
| 5,866,998 A | 2/1999 | Menegoli | 318/254 |
| 5,936,365 A | 8/1999 | Li et al. | 318/439 |
| 5,969,491 A | 10/1999 | Viti et al. | 318/354 |
| 6,236,174 B1 | * 5/2001 | White | 318/254 |

OTHER PUBLICATIONS

U.S. application No. 08/884,879, filed Jun. 30, 1997, pending.

* cited by examiner

Primary Examiner—Robert E. Nappi
Assistant Examiner—Rina I. Duda
(74) Attorney, Agent, or Firm—Lisa K. Jorgenson; Andre Szuwalski

(57) ABSTRACT

A circuit and method are disclosed for determining whether a brushless polyphase motor is spinning in a reverse direction relative to spin direction during normal operation. The circuit receives a back emf signal of a first phase line and determines a polarity of the back emf signal following a back emf signal associated with a second phase line crossing a zero reference level. Based upon the determined polarity of the back emf signal of the first phase line, the circuit selectively asserts an output signal indicating that the motor is spinning in the reverse direction.

29 Claims, 3 Drawing Sheets

CIRCUIT AND METHOD FOR DETECTING BACKWARD SPIN OF A SPINDLE MOTOR FOR A DISK DRIVE

BACKGROUND OF THE INVENTION

1. Technical Field of the Invention

The present invention relates to controlling brushless motors, and particularly to a circuit and method for detecting a backward spin of a polyphase motor for use in the control thereof.

2. Background of the Invention

A "brushless" motor includes a permanent magnet rotor and a stator made up of a number of windings that may be connected in a star configuration or completely independent from each other. In the first case there exist a number of external terminals equal to the number of the motor's phases. In the second case reference is made to motors with independent phases and both terminals of each winding being available externally. These motors are commonly used in hard and floppy disk drives, DVD (digital video disk) drives, tape video recorders, CD players, etc.

In the majority of cases, brushless motors are three-phase and the driving circuit generally comprises integrated circuits whose output stages drive the phase windings or lines. The integrated circuits may either comprise a three-phase, full-wave, half-bridge circuit in the case of motors connected in a star configuration, or three full-bridge circuits in the case of independent phase motors.

By way of simplification, consider the typical case of a three-phase motor driven in a bipolar mode in which, at each instant, two phase windings are powered, while the third phase winding is momentarily unpowered (full-bridge or half-bridge output node in a state of high impedance). The phase windings or lines are switchingly driven according to a cyclical sequence which must be synchronized with the rotor's instantaneous position. In a bipolar driving mode, the position may be determined by analyzing the back-electromotive-force (bemf) monitored on the winding that is momentarily unpowered, or sensed by Hall-effect sensors (a more expensive approach that is seldom used). Normally, such a bemf monitoring detects the zero crossing of the bemf that has a sinusoidal or in any case periodic waveform, generally referred to as a "zero-cross" instant.

Indeed, information on the rotor's instantaneous position is necessary for driving a synchronous motor, such as a brushless motor.

One application of brushless motors is in disk drive systems in which a brushless motor is utilized to spin the disk on which data is stored. One problem encountered in driving and/or controlling a synchronous motor in a disk drive system is the disk initially spinning in a reverse direction relative to an operative forward direction. In particular, it is desirous for the disk to reliably and predictably spin up to an operable spinning speed from an inoperable or standby state, such as a state following the motor being slowed or spun down due to an absence of new requests for memory access. When a sequence of drive signals are applied to the motor windings during a spin up routine, the initial timing of the sequence of applied drive signals may potentially be incorrect relative to the position of the motor's rotor, thereby generating negative torque and causing the disk to undesirably spin in a direction that is opposite of the direction of spin during normal operation. This condition is further complicated by the fact that oftentimes different motors and power supplies are used in disk drive systems, thereby presenting additional variables to driving the disk motor which may lead to greater uncertainty in avoiding negative torque and backward disk spin.

Based upon the foregoing, there is a need for preventing the rotor of a brushless, synchronous motor from spinning in a direction that is opposite to a direction of spin during normal operation.

SUMMARY OF THE INVENTION

The present invention overcomes the shortcomings in prior systems and thereby satisfies a significant need for a circuit and method for detecting backward spin of a synchronous multi-phase motor for use in applications including disk drive systems. According to a preferred embodiment of the present invention, following the detection of a bemf signal from a first phase line crossing a zero reference, the circuit receives a bemf signal from a second phase winding and/or phase line of a polyphase motor and detects and/or determines a polarity of the bemf signal of the second phase line. The circuit generates a control signal that is selectively asserted indicating the polyphase motor is moving in a reverse direction based upon the detected polarity of the bemf signal of the second phase line. The circuit detects/determines the polarity of the back emf signal of the second phase line following each zero crossing of the back emf signal of the first line.

In particular, the circuit includes a timer element which is enabled upon the zero crossing of the back emf signal of the first phase line. Upon the timer element reaching a predetermined value, the circuit detects/determines the polarity of the back emf signal of the second phase line as mentioned above. The lapse of the predetermined period of time follows the completion of a commutation sequence so that noise and/or other phenomena do not adversely effect the polarity detection of the second phase line.

The circuit preferably includes circuitry for sequentially detecting a polarity of each phase line prior to a zero crossing thereof, and determining whether the motor is spinning in a reverse direction based upon at least one detected polarity of the phase lines.

The control signal generated by the circuit is provided to a processing unit that controls the application of drive signals to the phase lines of the polyphase motor. The control signal may be stored in a flag of a status register for subsequent handling by the processing unit.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 1:
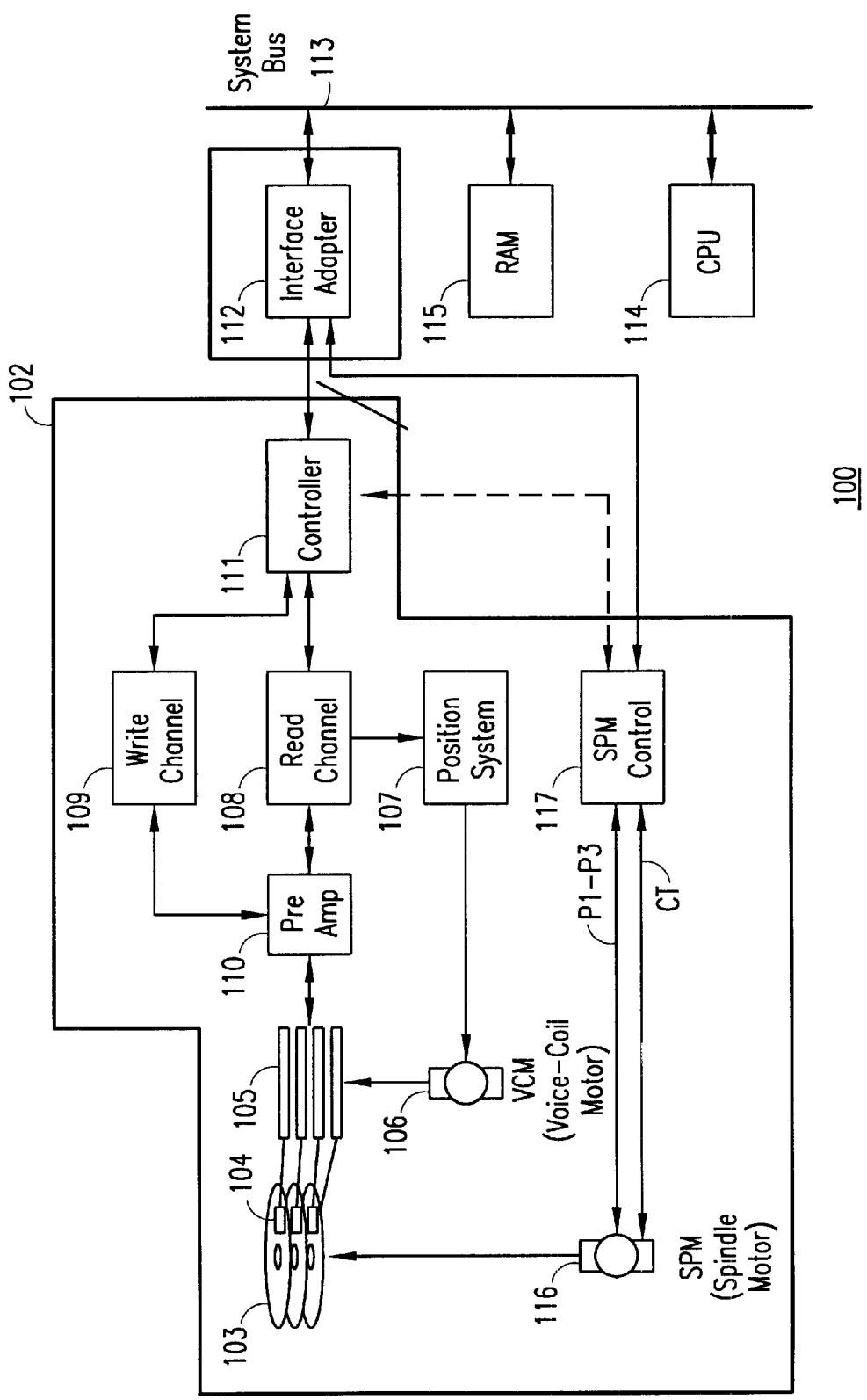
FIG. 1 is a function block diagram of a disk drive system according to a preferred embodiment of the present invention.

Referring to FIG. 1, there s shown a block diagram of an exemplary disk drive system 100 including a disk drive 102 in accordance with the present invention. Disk drive 102 includes a storage medium in the form of ore of more disks 103, each of which may contain data on both sides of the disk. Data is written to disks 103 and/or read therefrom by one or more read/write heads 104. The read/write head 104 is connected to an arm 105, with both read/write head 104 and arm 105 being positionally controlled by a voice-coil motor ("VCM") 106 and a position system 107. The position system 107, through VCM 106, positionally maintains and/or moves head 104 radially over the desired data on disks 103. A read channel 108 converts an analog read signal from head 104 into digital form. A write channel 109 provides data in analog form to read/write head 104 for storing on a disk 103. A pre-amplifier 110 suitably conditions data read from and to be written to disk 104. Channel controller 111 recognizes and organizes the digital data from the read channel 108 and digital data to be sent to write channel 109 into bytes of data. An interface adapter 112 provides an interface between channel controller 111 and a system bus 113 that may be particular to the host system. The host system will also typically have other devices that communicate on system bus 113, including a central processing unit ("CPU") 114 and memory 115. A spindle motor ("SPM") 116 and SPM control circuit 117 rotate disk 103 and maintain disk 103 at the proper speed for performing a memory access operation (read or write operation). The SPM control circuit 117 may communicate with interface adapter 112, as shown in FIG. 1. Alternatively, SPM control circuit 117 may be controlled by or otherwise communicate with channel controller 111, as shown in dashed lines in FIG. 1.

Figure 2:
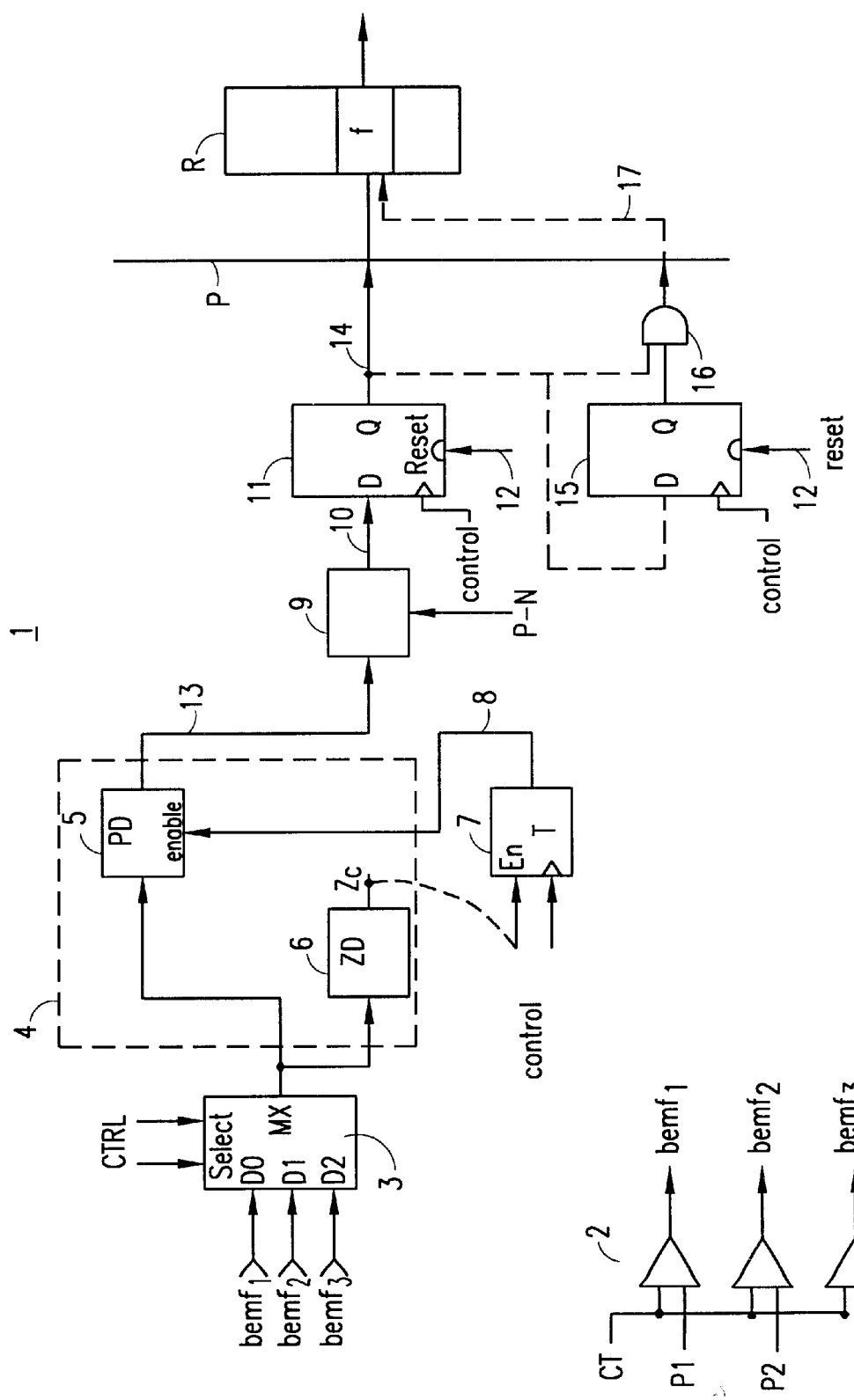
FIG. 2 is a function block diagram of a backspin detect circuit of the spindle motor control block of FIG. 1.

Referring to FIG. 2, there is shown backspin detect circuit 1 which forms a portion of SPM control circuit 117 of disk drive system 100 in an exemplary embodiment of the present invention. It is understood, however, that backspin detect circuit 1 may be utilized in other applications having a polyphase motor.

For exemplary purposes, spindle motor 116 is a three-phase bipolar-driven motor connected in a "Y" configuration for exemplary purposes only.

Backspin detect circuit 1 preferably generates or receives back emf (bemf) signals from each phase line of polyphase spindle motor 116, determines from those back emf signals whether the motor 116 is spinning in a reverse direction relative to the direction of spin during normal operation, and selectively asserts a backspin flag F in affirmative response thereto. Back emf signals $bemf_1$, $bemf_2$ and $bemf_3$ are respectively extracted from the center tap CT and phase lines P1, P2 and P3 of spindle motor 116. Specifically, three differential comparator circuits 2 are connected to phase lines P1, P2 and P3 to respectively extract the back emf signals $bemf_1$, $bemf_2$ and $bemf_3$. Each differential comparator circuit 2 has a first input terminal connected to the center tap CT of the phase lines P1–P3 of spindle motor 116 and a second input terminal connected the input terminal of a distinct phase line. The output signals from differential comparator circuits 2 are the back emf signals $bemf_1$, $bemf_2$ and $bemf_3$.

Backspin detect circuit 1 generates or receives back emf signals $bemf_1$, $bemf_2$ and $bemf_3$ as output from differential comparators 2. Back emf signals $bemf_1$, $bemf_2$ and $bemf_3$ drive the data inputs of multiplexing circuit 3 that outputs a selected one of the back emf signals. The selection and/or control inputs of multiplexing circuit 3 are driven by control signals CTRL which select the particular back emf signal for output that is associated with the phase line that is presently floating or undriven in the bipolar driven system. In other words, control signals CTRL correspond to or are otherwise generated by commutation control signals that control the driving of phase lines P1–P3.

The selected back emf signal (the output of multiplexing circuit 3) drives a processing element 4 that, in general terms, determines the polarity of the selected back emf signal ($bemf_1$, $bemf_2$ or $bemf_3$). Processing element 4 may, for instance, include a polarity detect (PD) circuit 5 which determines whether the voltage or current level of the currently selected back emf signal ($bemf_1$, $bemf_2$ or $bemf_3$) is above or below a zero reference level. Polarity detect circuit 5 preferably receives an enable signal 8 that, when asserted, triggers the polarity detection operation, as will be explained below. The output of polarity detect circuit 5 may be driven to a first logic level in the event the signal level of the currently selected back emf signal is greater than the zero reference and to a second logic level in the event the signal level of the currently selected back emf signal is less than the zero reference. The output of polarity detect circuit 5 may be a latched signal.

Polarity detect circuit 5 is enabled so that the polarity of the currently selected back emf signal ($bemf_1$, $bemf_2$ or $bemf_3$) is determined a predetermined period of time prior to the zero crossing thereof so as to increase the noise margin associated with the polarity detection. In a preferred embodiment of the present invention, the polarity of the currently selected back emf signal $bemf_1$, $bemf_2$ or $bemf_3$ is determined following the zero crossing of a previously selected back emf signal (associated with a previously floating phase line) and/or a back emf signal whose value most recently crossed the zero reference. By triggering the polarity detection operation prior to the zero crossing of the currently selected back emf signal, the currently selected back emf signal ($bemf_1$, $bemf_2$ or $bemf_3$) is assured to be at a detectable level, either positive or negative, away from the zero reference.

Backspin detect circuit 1 preferably includes a timer (T) element 7 that is activated upon the zero crossing of the previously selected back emf signal and asserts enable signal 8 a predetermined period of time thereafter. The assertion of enable signal 8 thereupon enables polarity detect circuit 5 to perform the polarity determination of the currently selected back emf signal. Noting that the zero crossing of a back emf signal initiates a commutation operation, the enabling of polarity detect circuit 5 a predetermined period of time following the zero crossing of the previously selected back emf signal and/or a predetermined period of time before the zero crossing of the currently selected back emf signal substantially eliminates any noise caused by the commutation process from interfering with the polarity detection operation of the currently selected back emf signal.

Processing element 4 may further include a zero detect (ZD) circuit 6 that asserts an output signal when the selected back emf signal $bemf_1$, $bemf_2$ or $bemf_3$ crosses a zero reference. Zero detect circuit 6 may be associated with the activating of timer element 7 and the commutation activity for driving phase lines P1–P3. In this way, an input to timer element 7 may be connected to the output of zero detect circuit 6 (shown in dashed line in FIG. 2). Alternatively, zero detect circuit 6 does not form a part of circuitry for performing a commutation operation.

Backspin detect circuit 1 further includes a circuit 9 that receives the output of polarity detect circuit 5 as well as a control signal P-N that indicates whether a positive polarity or negative polarity of the selected back emf signal is anticipated, and generates a reverse spin detect signal 10 based in part upon the measured polarity. In particular, circuit 9 may perform a boolean logic operation on the output of polarity detect circuit 5 and the control signal P-N in generating reverse spin detect signal 10. For instance, if the logic level of the output signal 13 of polarity detect circuit 5 does not match the logic level of control signal P-N (having a logic level corresponding to the anticipated polarity of the currently selected back emf signal), then reverse spin detect signal 10 is asserted. Otherwise, reverse spin detect signal 10 is de-asserted. Noting that the output of polarity detect circuit 5 may be latched, reverse spin detect signal 10 is adapted to be selectively asserted following the zero crossing of the selected back emf signal, as detected by zero detect circuit 6. The value of reverse spin detect signal 10 is preferably latched in latch 11. Latch 11 may be reset by a spin enable control signal 12 generated by channel controller 11 or another processor that operates to control spindle motor 116.

The output signal 14 of latch 11 is preferably coupled to the serial port of channel controller 111 so as to alert channel controller 111 whether the spindle motor 116 is spinning in a reverse direction relative to the spin direction during normal operation. Channel controller 111 may receive the output of latch 11 in a backspin flag F of a read status register R associated with the serial port of channel controller 111. Channel controller 111 may thereafter read the contents of backspin flag F and take necessary remedial actions to correct the backspin situation.

Alternatively, output signal 14 may feed a second latch 15, the output of which is combined with output signal 14 via logic gate 16 to generate a second output signal 17 that drives back spin flag F of status register R (as shown in dashed lines in FIG. 2). In this way, channel controller 111 is alerted that spindle motor 116 is spinning in the reverse direction following the detection of the selected back emf signal having the incorrect polarity in two consecutive instances and/or detection measurements. For instance, channel controller 111 may be alerted of spindle motor 116 is spinning in the reverse direction upon the detection of the selected back emf signals having incorrect polarity in two consecutive commutation sequences.

It is understood that output signal 14 may instead drive a back spin flag F of a status register R corresponding to CPU 114 so as to alert CPU 114 of spindle motor 116 spinning in a reverse direction.

Figure 3:
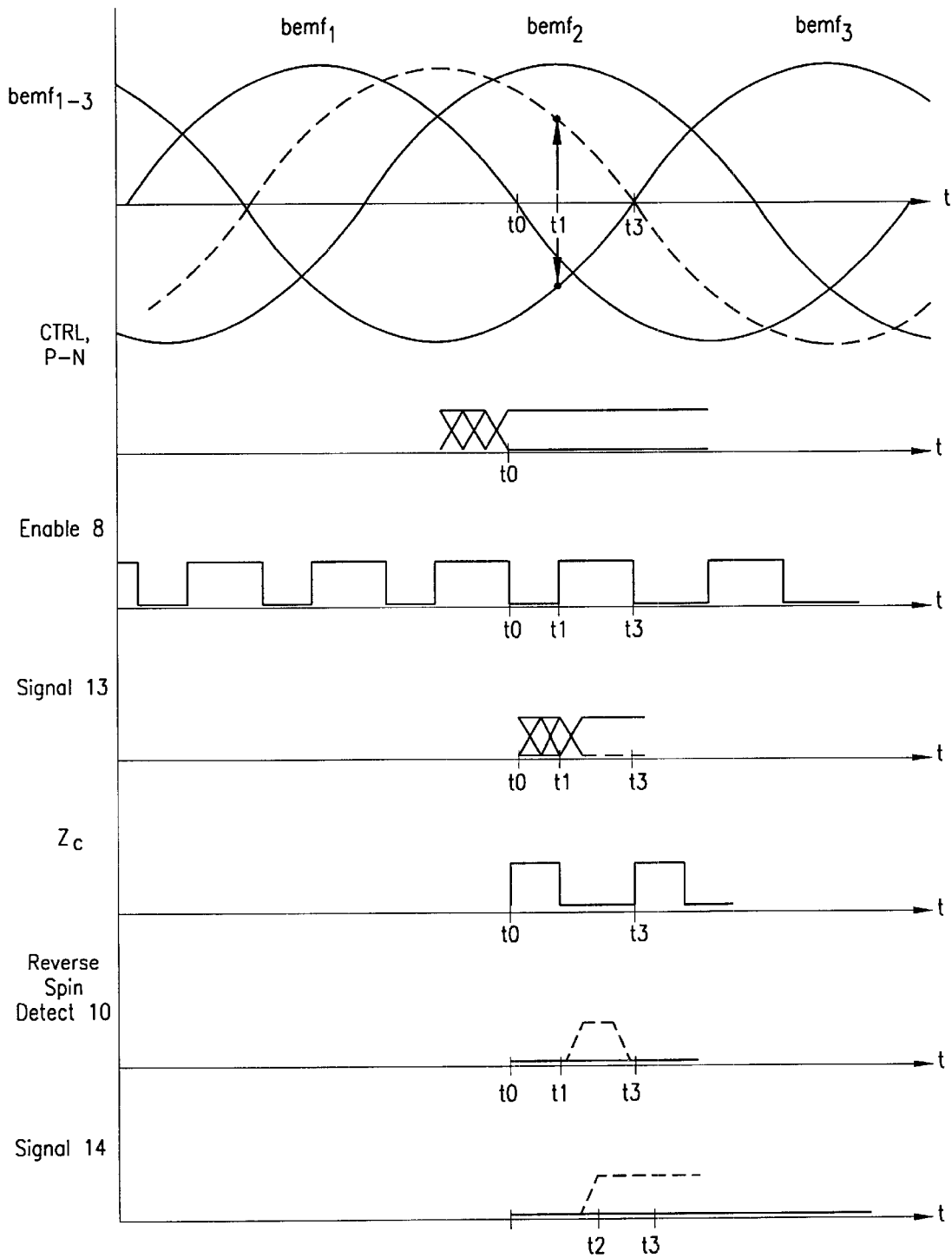
FIG. 3 is a waveform diagram illustrating an operation of the backspin detect circuit of FIG. 2.

The operation of backspin detect circuit 1 within the context of a control system for polyphase spindle motor 116 of disk drive system 100 will be described with reference to FIG. 3. It is assumed that drive signals are applied to phase lines P1–P3 in a sequence that yield back emf signals $bemf_1$, $bemf_2$ and $bemf_3$ as shown in FIG. 3 during normal operation, including initial spin-up operation. Upon each zero crossing of a back emf signal, the system commutates so as to sequentially switch phase lines P1–P3 that are being driven. At time t0, back emf signal $bemf_1$, crosses the zero reference (in a falling direction) and thereby initiates a commutation procedure. The zero crossing of back emf signal $bemf_1$ activates timer element 7 to begin counting. Because back emf signal $bemf_1$ crossed zero in a falling direction, the system anticipates shortly after time t0 that the next zero crossing of a back emf signal will be back emf signal $bemf_3$ in a rising direction. Accordingly, multiplexer control signals CTRL and control signal P-N are driven to appropriate logic levels to determine if the next back emf signal to be tested and/or cross the zero reference, back emf signal $bemf_3$, is rising thus indicating a forward spin.

After timer element 7 has counted for the predetermined period of time following time t0, timer element 7 asserts at time t1 enable signal 8. Time t1 preferably follows a completion of the commutation operation so that noise stemming from the commutation operation can no longer effect back spin circuit 1. The assertion of enable signal 8 causes polarity detect circuit 5 to determine the polarity of back emf signal $bemf_3$. In an exemplary scenario in which back emf signal $bemf_3$ is rising following time t0 (as shown as a solid line in FIG. 3 and thus indicating a forward spin), polarity detect circuit 5 detects a negative polarity and the output signal 13 of polarity detect circuit 5 is asserted (shown as a solid line) shortly after time t1. Otherwise, back emf signal $bemf_3$ is falling following time t0 (as shown in dashed line in FIG. 3 and thus indicating a reverse spin), and polarity detect circuit 5 detects a positive polarity and thereupon de-asserts output signal 13 (shown as a dashed line) shortly after time t1.

Next, the output signal 13 of polarity detect circuit 5 and control signal P-N are combined by circuit 9 to generate reverse spin detect signal 10. In the present exemplary scenario, reverse spin detect signal 10 is de-asserted (as shown in solid line) to indicate that back emf signal $bemf_3$ is consistent with the spindle motor 116 spinning in a forward direction (negative polarity at time t1), and asserted as a pulse (as shown in dashed line) to indicate that back emf signal $bemf_3$ is consistent with the spindle motor 116 spinning in a reverse direction (positive polarity at time t1). The value of reverse spin detect signal 10 is stored in latch 11 at time t2. Thereafter, the value of reverse spin detect signal 10, stored in latch 11 at output signal 14, is available for writing into back spin flag f of read register R of the serial port of channel controller 111.

Following time t2, another commutation sequence is initiated and multiplexer control signals CTRL and control signal P-N are updated to reflect backspin detect circuit 1 next determining whether back emf signal $bemf_2$ indicates that the spindle motor 116 is spinning in the reverse direction.

In the alternative embodiment of backspin detect circuit 1 utilizing latch 15, output signal 14 is stored in latch 15 during the next measurement period, such as the next commutation sequence during which the polarity of back emf signal $bemf_2$ is detected. In the event the detected polarity of back emf signal $bemf_2$ and the previously detected polarity of back emf signal $bemf_3$ both indicate that spindle motor 116 is spinning in a backward direction, then the output of gate 16 is asserted and thereafter stored in back spin flag F of status register R.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for a polyphase motor having a plurality of phase lines and a rotor movably responsive to drive control signals sequentially placed on the phase lines, comprising:

a receiving circuit for receiving a back emf signal of a first phase line and a back emf signal of a second phase line of the plurality of phase lines;

a polarity detecting circuit for detecting a polarity of the back emf signal of the second phase line following a back emf signal of the first phase line crossing a zero reference level;

an indicating circuit for generating a signal indicating the polyphase motor moving in a reverse direction based upon the detected polarity of the back emf signal of the second phase line; and a timer element having an output that enables the polarity detecting circuit to detect the polarity of the back emf signal of the second phase line.

2. The circuit of claim 1, wherein:

the polarity detecting circuit detects the polarity of the back emf signal of the second phase line following each occurrence of the back emf signal of the first phase line crossing the zero reference level.

3. The circuit of claim 1, wherein:

the polarity detecting circuit detects the polarity of the back emf signal of the second phase line a predetermined period of time following the back emf signal of the first phase line crossing the zero reference level.

4. The circuit of claim 1, wherein:

the polarity detecting circuit detects the polarity of the back emf signal of the second phase line a predetermined period of time before the zero crossing of the back emf signal of the second phase line is anticipated.

5. The circuit of claim 1, wherein:

the timer element is enabled approximately at an occurrence of the back emf signal of the first phase line crossing the zero reference level.

6. The circuit of claim 1, further comprising:

a storage element for storing the value of the signal generated by the indicating circuit.

7. The circuit of claim 1, wherein:

the indicating circuit comprises a logic circuit having as a first input an output of the polarity detecting circuit.

8. The circuit of claim 1, further comprising:

a multiplexing circuit for receiving a back emf signal from each of the plurality of phase lines, and providing a selected back emf signal to an input of the polarity detecting circuit.

9. The circuit of claim 8, further comprising:

a zero detecting circuit having an input connected to an output of the multiplexing circuit;

the timer element is coupled to the zero detecting circuit and the polarity detecting circuit and counts a period of time substantially immediately following an assertion of an output of the zero detecting circuit, an output of the timer element enabling the polarity detecting circuit to determine the polarity of a phase line selected by the multiplexing circuit.

10. The circuit of claim 8, wherein:

the multiplexing circuit receives control signals corresponding to controlling commutation between the phase lines.

11. A circuit for a polyphase motor having a plurality of phase lines and a rotor movably responsive to drive control signals sequentially placed on the phase lines, comprising:

a receiving circuit for receiving a back emf signal of a first phase line and a back emf signal of a second phase line of the plurality of phase lines;

a polarity detecting circuit for detecting a polarity of the back emf signal of the second phase line following a back emf signal of the first phase line crossing a zero reference level; and an indicating circuit for generating a signal indicating the polyphase motor moving in a reverse direction based upon the detected polarity of the back emf signal of the second phase line;

a storage element for storing the value of the signal generated by the indicating circuit; and a status register, a bit of the status register representing a reverse spin flag, an output of the storage element driving an input of the reverse spin flag of the status register.

12. A circuit for a polyphase motor having a plurality of phase lines and a rotor movably responsive to drive control signals sequentially placed on the phase lines, comprising:

a receiving circuit for receiving a back emf signal of a first phase line and a back emf signal of a second phase line of the plurality of phase lines;

a polarity detecting circuit for detecting a polarity of the back emf signal of the second phase line following a back emf signal of the first phase line crossing a zero reference level; and an indicating circuit for generating a signal indicating the polyphase motor moving in a reverse direction based upon the detected polarity of the back emf signal of the second phase line;

wherein the detected polarity of the back emf signal of the second phase line occurs during a first commutation sequence in which the second phase line is undriven; and the circuit further comprises:

a first storage element for storing the value of the signal generated by the indicating circuit; and a second storage element for storing the value of the signal generated by the indicating circuit, an output of the second storage element being combined with the output of the first storage element to generate a signal indicating a detection of a reverse spin on the polyphase motor in consecutive detections.

13. A method of determining a direction of a polyphase motor having a plurality of phase lines and a rotor movably responsive to drive control signals sequentially placed on the phase lines, comprising the steps of:

detecting a zero crossing of a back emf signal of a first phase line;

detecting a polarity of a back emf signal of a second phase line a predetermined period of time following an affirmative detection of a zero crossing of the back emf signal of the first phase line; and asserting a flag indicating an affirmative detection of the polyphase motor moving in a reverse direction based upon the detected polarity of the back emf signal of the second phase line.

14. The method of claim 13, wherein the step of detecting a polarity comprises the step of:

detecting a polarity of the back emf signal of the second phase line a predetermined period of time following the affirmative detection of a zero crossing of the back emf signal of the first phase line.

15. The method of claim 13, wherein the step of detecting a polarity comprises the step of:

detecting a polarity of the back emf signal of the second phase line a period of time before an anticipated zero crossing of the back emf signal of the second phase line.

16. A method of determining a direction of a polyphase motor having a plurality of phase lines and a rotor movably responsive to drive control signals sequentially placed on the phase lines, comprising the steps of:

detecting a zero crossing of a back emf signal of a first phase line;

detecting a polarity of a bask emf signal of a second phase line following an affirmative detection of a zero crossing of the back emf signal of the first phase line; and asserting a flag indicating an affirmative detection of the polyphase motor moving in a reverse direction based upon the detected polarity of the back emf signal of the second phase line;

wherein the steps of detecting a zero crossing, detecting a polarity and asserting a flag are sequentially repeated for each phase line of the polyphase motor.

17. A method of determining a direction of a polyphase motor having a plurality of phase lines and a rotor movably responsive to drive control signals sequentially placed on the phase lines, comprising the steps of:

detecting a zero crossing of a back emf signal of a first phase line;

detecting a polarity of a back emf signal of a second phase line following an affirmative detection of a zero crossing of the back emf signal of the first phase line;

asserting a flag indicating an affirmative detection of the polyphase motor moving in a reverse direction based upon the detected polarity of the back emf signal of the second phase line; and prior to the step of detecting a polarity, selecting a phase line of the polyphase motor as the second phase line.

18. The method of claim 17, wherein:

the steps of detecting a zero crossing, selecting a phase line, detecting a polarity and asserting a flag are sequentially repeated for each phase line of the polyphase motor; and the first phase line is a phase line selected during a previous step of selecting the second phase line.

19. A method of determining a direction of a polyphase motor having a plurality of phase lines and a rotor movably responsive to drive control signals sequentially placed on the phase lines, comprising the steps of:

detecting a zero crossing of a back emf signal of a first phase line;

detecting a polarity of a back emf signal of a second phase line following an affirmative detection of a zero crossing of the back emf signal of the first phase line;

asserting a flag indicating an affirmative detection of the polyphase motor moving in a reverse direction based upon the detected polarity of the back emf signal of the second phase line; and interrupting a driving current of the second phase line prior to the step of detecting a polarity.

20. A system for a multi-phase brushless motor of a type having a plurality of phase windings and a rotor, comprising:

a first circuit for detecting a first electrical characteristic of a first phase winding;

a second circuit for determining a second electrical characteristic of a second phase winding following the detection of the first electrical characteristic of the first phase winding; and a third circuit for determining whether the multi-phase brushless motor is spinning in a reverse direction relative to an operative forward spinning direction, based upon an affirmative determination of the second electrical characteristic of the second phase winding;

wherein the second circuit comprises a polarity determining circuit, the polarity determining circuit being selectively enabled a predetermined time following the affirmative detection of the first electrical characteristic of the first phase line.

21. The system of claim 20, wherein:

the first circuit comprises a zero detection circuit.

22. The system of claim 20, further comprising:

a timer element being activated upon the affirmative detection of the first electrical characteristic of the first phase line, an output of the timer element being an input to the polarity determining circuit and being asserted the predetermined period of time following the affirmative detection of the first electrical characteristic.

23. A system for a multi-phase brushless motor of a type having a plurality of phase windings and a rotor, comprising:

a first circuit for detecting a first electrical characteristic of a first phase winding;

a second circuit for determining a second electrical characteristic of a second phase winding following the detection of the first electrical characteristic of the first phase winding; and a third circuit for determining whether the multi-phase brushless motor is spinning in a reverse direction relative to an operative forward spinning direction, based upon an affirmative determination of the second electrical characteristic of the second phase winding;

wherein the second electrical characteristic comprises a polarity of a signal appearing on the second phase winding.

24. A disk drive system, comprising:

at least one disk on which data is stored;

at least one head positioned proximally to the disk;

channel control circuitry for positioning the head in a desired position relative to the disk, receiving data sensed by the head during a read operation and placing data on the head during a write operation;

a polyphase spindle motor, connected to spin the disk, having a rotor and a plurality of phase windings; and spindle motor control circuitry, connected to the phase windings of the spindle motor, for controlling the spindle motor, comprising:

a first circuit for determining a polarity of a signal appearing on a first phase winding a predetermined period of time away from a zero crossing thereof; and a second circuit for determining whether the polyphase motor is spinning in a reverse direction, relative to a spin direction during normal operation, based upon at least one determined polarity of the signal appearing on the first phase winding.

25. The disk drive system of claim 24, wherein:

the first circuit comprises a polarity determining circuit selectively enabled the predetermined period of time away from each zero crossing of the signal appearing on the first phase winding.

26. The disk drive system of claim 25, further comprising:

a timer element having an output connected to enable the polarity determining circuit and activated upon a zero crossing of the signal appearing on the first phase winding.

27. The disk drive system of claim 24, wherein the first circuit determines the polarity of a signal appearing on each phase winding a predetermined period of time away from a zero crossing thereof.

28. The disk drive system of claim 24, wherein the first circuit determines a polarity of the signal appearing on the first phase winding the predetermined period of time prior to a zero crossing thereof.

29. The disk drive system of claim 25, wherein the polarity determining circuit is selectively enabled a predetermined period of time away from each zero crossing of the signals appearing on the phase windings.

* * * * *